United States Patent
Heisler

(10) Patent No.: US 9,535,188 B2
(45) Date of Patent: Jan. 3, 2017

(54) APPARATUS AND METHOD FOR LOCALIZED DETECTION AND WARNING OF SEVERE WEATHER

(75) Inventor: Joseph Heisler, Columbus, OH (US)

(73) Assignee: STORM WARNING, LLC, Columbus, OH (US)

( * ) Notice: Subject to any disclaimer, the term of this patent is extended or adjusted under 35 U.S.C. 154(b) by 57 days.

(21) Appl. No.: 13/357,655

(22) Filed: Jan. 25, 2012

(65) Prior Publication Data

US 2013/0187782 A1   Jul. 25, 2013

(51) Int. Cl.
*G01W 1/00* (2006.01)
*G01W 1/02* (2006.01)

(52) U.S. Cl.
CPC ..................... *G01W 1/02* (2013.01)

(58) Field of Classification Search
CPC ............. G01W 1/00; G01W 1/02; G01W 1/10
USPC   73/170.13, 384; 116/70; 290/55; 340/425.5, 539.26, 539.28, 601, 626, 905, 340/945, 970; 342/26 R; 702/2, 3
See application file for complete search history.

(56) References Cited

U.S. PATENT DOCUMENTS

| | | | |
|---|---|---|---|
| 4,287,762 A * | 9/1981 | Baer | 73/170.16 |
| 4,631,960 A * | 12/1986 | Wogerbauer | 73/384 |
| 4,632,052 A | 12/1986 | Green | |
| 5,002,502 A * | 3/1991 | Hill | 439/536 |
| 5,178,010 A * | 1/1993 | Holzel | 73/384 |
| 5,355,350 A | 10/1994 | Bass et al. | |
| 5,379,025 A | 1/1995 | Tatom et al. | |
| 5,546,800 A | 8/1996 | Daniel | |
| 5,612,667 A * | 3/1997 | Trumpy et al. | 340/425.5 |
| 5,717,589 A | 2/1998 | Thompson et al. | |
| 5,801,636 A | 9/1998 | Tatom et al. | |
| 5,979,217 A * | 11/1999 | Wallrafen | 73/1.59 |
| 6,034,608 A | 3/2000 | Frank et al. | |
| 6,097,296 A | 8/2000 | Garza et al. | |
| 6,125,328 A | 9/2000 | Baron et al. | |
| 6,163,756 A | 12/2000 | Baron et al. | |
| 6,169,487 B1 * | 1/2001 | Davis | 340/601 |
| 6,188,960 B1 | 2/2001 | Baron et al. | |
| 6,272,433 B2 | 8/2001 | Baron et al. | |
| 6,278,947 B1 | 8/2001 | Baron et al. | |
| 6,310,554 B1 | 10/2001 | Carrell | |
| 6,356,843 B1 | 3/2002 | Baron et al. | |
| 6,401,039 B1 | 6/2002 | Baron et al. | |
| 6,452,510 B1 * | 9/2002 | Zysko | 340/970 |

(Continued)

OTHER PUBLICATIONS

Holden, J. et al., "UK tornado climatology and the development of simple prediction tools", Quarterly Journal of the Royal Meteorological Society, 2004, pp. 1009-1021.*

(Continued)

*Primary Examiner* — Benjamin C Lee
*Assistant Examiner* — Stephen Burgdorf
(74) *Attorney, Agent, or Firm* — Standley Law Group, LLP; Jeffrey Standley; Tyler Dunham

(57) ABSTRACT

An apparatus and method for determining the localized presence of severe weather and signaling an alarm. An outdoor sensor assembly may contain a number of sensors including a barometric pressure sensor, temperature sensor, and humidity sensor. The outdoor sensor assembly is in electrical communication with an indoor controller assembly. A plurality of parameters may be measured and compared with pre-established threshold values. The alarm may be signaled when the measured parameters meet or exceed the selected threshold values.

5 Claims, 4 Drawing Sheets

(56) References Cited

U.S. PATENT DOCUMENTS

| | | | |
|---|---|---|---|
| 6,670,908 B2 | 12/2003 | Wilson et al. | |
| 6,714,134 B2 * | 3/2004 | Addink et al. | 340/601 |
| 6,751,580 B1 | 6/2004 | Cope et al. | |
| 7,066,020 B1 * | 6/2006 | Moore et al. | 73/170.16 |
| 7,129,857 B1 * | 10/2006 | Spirkovska | 340/971 |
| 7,324,002 B2 * | 1/2008 | Iso-Heiko et al. | 340/601 |
| 7,688,214 B1 | 3/2010 | Karamanian et al. | |
| 7,917,291 B2 | 3/2011 | Havin et al. | |
| RE43,903 E * | 1/2013 | Brown | 702/3 |
| 2003/0201897 A1 | 10/2003 | Goldburt et al. | |
| 2005/0049789 A1 | 3/2005 | Kelly et al. | |
| 2005/0258971 A1 * | 11/2005 | Greenstein et al. | 340/601 |
| 2009/0182507 A1 | 7/2009 | Havin et al. | |
| 2010/0004863 A1 * | 1/2010 | Ladow et al. | 702/3 |

OTHER PUBLICATIONS

Colquhoun, John R. et al., "Relationships between tornado intensity and various wind and thermodynamic variables", Weather and Forcasting, vol. 11, (c) 1996 American Meteorological Society, pp. 360-371.*

* cited by examiner

APPARATUS AND METHOD FOR LOCALIZED DETECTION AND WARNING OF SEVERE WEATHER

CROSS-REFERENCE TO RELATED APPLICATIONS

This application is not related to any co-pending applications.

TECHNICAL FIELD

Embodiments generally relate to an apparatus and method for localized detection and warning of severe weather, including but not limited to tornadoes.

BACKGROUND OF THE ART

Most of the current weather forecast information used by individuals and businesses is obtained by them from weather reports provided by local television and radio stations. Such reports are typically prepared by meteorologists at a television or radio station serving a particular geographical area, e.g., a large city and surrounding environs. The reports are based on current weather information available to the meteorologists, which may be provided by various local (e.g., local radar) and national (e.g., NEXRAD radar and weather satellite) weather information sources. A meteorologist may also employ computer implemented weather forecasting models in preparing a weather forecast report. A meteorologist may prepare and/or update such reports throughout the day, and such reports may be provided as part of periodic radio and/or television broadcasts. A person who is interested in the current or forecast weather conditions for a geographic location accesses such a weather report by tuning in to the television or radio broadcast of the report at the designated time.

If severe weather threatens a particular area, an emergency radio or television broadcast may be made to provide such information to the public immediately and, if necessary, continuously. For example, a television station may provide a graphic indication of the general location (e.g., county) and nature of severe weather (e.g., tornado and thunderstorm warnings, etc.) as part of its television broadcast, throughout the period during which severe weather threatens an area. Such severe weather or storm warnings may be generated from various different weather information sources and provided in various different manners to the public. For example, a television station may subscribe to National Weather Service weather wire information, which includes weather warning bulletins authored by the National Weather Service Storm Prediction Center, and other related government agencies. The weather warning bulletins include tornado warnings, severe thunderstorm warnings, flash flood warnings, and the like.

NEXRAD weather radar weather information is also obtained from the government by many television stations. NEXRAD information includes a storm attributes table which defines storm cells and provides detailed information concerning the cells, including the characteristics of the cells (e.g., hail and vortex intensity and location, rain fall intensity, speed, etc.) as well as the position, direction, and speed of movement of the cells. A storm cell tracking and display system employed by the television station may use such NEXRAD data to determine the position of a storm and to derive a predicted storm path therefrom. Such a derived storm track may be displayed to viewers, e.g., as part of a severe weather update television report. Such a report may include a display indicating the time that a selected storm or storms is predicted to arrive at a particular city or town, based on the storm track derived from NEXRAD storm attribute information.

Government-provided NEXRAD radar data includes detailed information on storm cells, including detailed information on the characteristics of the cells, including their speed and direction of movement, contents (e.g., hail or tornadoes), etc. This detailed information is obtained by the NEXRAD radar system by performing a volumetric radar scan of the atmosphere. A weather tracking and display system can expect to receive updated NEXRAD weather information no more often than every six (6) minutes. The speed and direction of movement of a severe weather cell can change significantly during this relatively long period between NEXRAD updates. Thus, storm warnings based on the predicted track of a storm cell will become increasingly inaccurate between NEXRAD updates, if NEXRAD information alone is relied upon to determine the predicted track of a storm cell. Local or remote live radar systems perform a much more rapid scan of the atmosphere, and are, therefore, able to provide more up-to-the-minute information on the current location of a severe storm weather cell. Since such live radar systems are significantly less expensive than NEXRAD radar systems, many television news and weather operations have their own live local radar systems, in addition to access to government provided NEXRAD data, which provides much more detailed storm attribute information.

A limitation of conventional weather reports and storm warnings is that they are generalized over a relatively large geographic area. For example, a typical storm warning may indicate that severe weather, e.g., a tornado, thunderstorm, etc., is present or expected to arrive in a geographic area such as a county. Of course, such severe weather will arrive at different locations in the county at different times, and some areas of a county under a weather warning may not receive any severe weather at all. Since many storm systems (especially tornadoes) are highly localized, they might strike one side of the street while leaving the other untouched. A county-wide storm warning, therefore, does not provide sufficient information for an individual to know whether or when to expect severe weather at his home, place of work, or other specific location of interest within the county.

Televised weather reports which provide expected arrival times of severe weather at specific cities or other populated areas are also of limited value for many individuals. Such reports, which may employ NEXRAD information or NEXRAD information in combination with live radar information to provide accurate storm cell tracking, typically only provide arrival time information for a handful of populated areas in the path of a storm. Those in rural areas and smaller towns in the path of a storm must attempt to estimate on their own, from the graphics provided in the televised weather warning broadcast, if severe weather will reach their area and, if so, when. Still further, in many cases a power outage may cause TV and radio signals to go dark (either at the station or at the individual's location) so these warnings may not be available.

What is desired, therefore, is a system and method which provides localized storm or other severe weather warnings to individuals or businesses which indicate whether or not a storm will reach an individual's location of interest and, if so, when.

SUMMARY OF THE EXEMPLARY EMBODIMENTS

Exemplary embodiments provide an apparatus and method for determining the localized presence of severe weather and signaling an alarm. An outdoor sensor assembly may contain a number of sensors including a barometric pressure sensor, temperature sensor, and humidity sensor. The outdoor sensor assembly is in electrical communication with an indoor controller assembly (either hard wired or wireless). A plurality of parameters may be measured and compared with pre-established threshold values. The alarm may be signaled when the measured parameters meet or exceed the selected threshold values.

It has been discovered that the rate of change in barometric pressure is an excellent indicator of severe weather (esp. tornados). This parameter, sometimes in conjunction with other parameters, can be measured to determine the imminent presence of severe weather in order to signal an alarm so that user's may take cover and/or protect themselves or their property from harm. The device may also contain a wind speed and/or direction sensor and may function as a general weather information device for the user. By locating the device at the home of the user and performing careful calculations and measurements, the extremely localized types of weather phenomenon (esp. tornados) may be detected based on the exact user's current location, and not based on a general prediction for an entire county or larger area.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
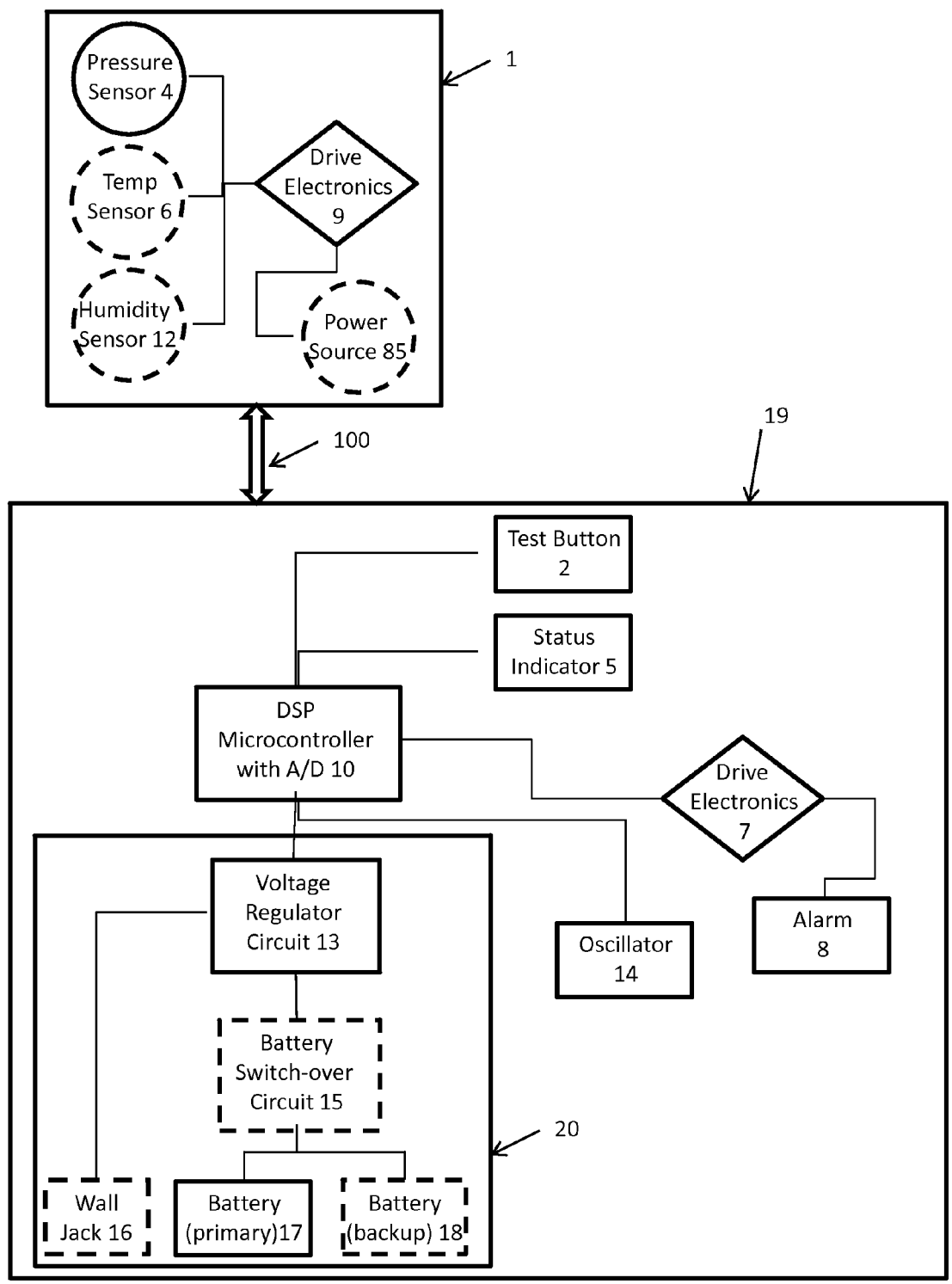
FIG. 1 is an electrical schematic for one generalized embodiment of the localized severe weather warning device.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an electrical schematic for one embodiment of the localized severe weather warning device. An exemplary embodiment contains two primary assemblies: the outdoor sensor assembly 1 and the indoor controller assembly 19. These two primary assemblies provide electrical communication 100 between one another. In an exemplary embodiment, the electrical communication 100 may be flexible electrical conductors, preferably ribbon cable. In another embodiment, the electrical communication 100 may be wireless electrical communication. For the wireless embodiment, an optional power source 85 is shown in electrical communication with the drive electronics 9 in the outdoor sensor assembly 1. The power source 85 may be a battery, hard wired, or some combination of these two.

In the embodiment shown in FIG. 1, the outdoor sensor assembly 1 contains at least one sensor. In one embodiment, the outdoor sensor assembly 1 contains only a barometric pressure sensor 4. In another embodiment, the outdoor sensor assembly 1 contains three sensors: a pressure sensor 4, a temperature sensor 6, and a humidity sensor 12. In an exemplary embodiment, the pressure sensor 4 would be a temperature compensated pressure transducer where the sensor's voltage output is proportional to the atmospheric pressure exerted on it. The three sensors may be conditioned and buffered through drive electronics 9 to facilitate the electrical communication with the indoor controller assembly 19.

Within the indoor controller assembly 19, a microcontroller 10 is clocked, preferably clocked by a crystal oscillator 14. An exemplary microcontroller 10 would provide digital signal processing and may contain and internal or be used with an external analog/digital converter. The microcontroller 10 may receive the electrical communications from the outdoor sensor assembly 1 and perform several calculations and/or algorithms to determine if severe weather is imminent. The microcontroller 10 is preferably placed in electrical communication with the alarm 8 which may be activated when the microcontroller 10 has determined that severe weather is imminent. Depending on the type of alarm 8 being used, the microcontroller 10 may communicate with the alarm 8 through appropriate drive electronics 7. Preferably, the alarm 8 may be a Sonalert® alarm, available commercially from Mallory Sonalert Products; Indianapolis, Ind. www.mallory-sonalert.com However, any number of different alarm devices can be used with any of the embodiments described herein.

The indoor controller assembly 19 may also include a status indicator 5 which may indicate the operations of the system to a user through some type of visual indicator. The visual indicator could be a graphic on a display (such as LCD, OLED, or the like) or simply one or more light sources which may become illuminated in some recognizable fashion to indicate the operations of the system. In some embodiments, the status indicator 5 may comprise a pair of LEDs, possibly of a different color, where their illumination can indicate what mode the system is currently operating in and/or if there are any errors. A test button 2 may also be in electrical communication with the microcontroller 10 and may be selected by the user in order to run a 'test' of the system to ensure that it is functioning properly.

The localized severe weather warning device may be powered by a power supply assembly 20, which may contain a battery 17. In some embodiments, the power supply assembly 20 would also contain a wall jack 16. In one embodiment, the device may be powered primarily through the wall jack 16 until there is an interruption in the household power supply, at which point the device would then be powered by the battery 17. In another embodiment, the device may be powered primarily through the battery 17 until this battery is drained, at which point a backup battery 18 may be used to power the device (the status indicator 5 may then indicate that the primary battery 17 has been drained and needs replaced). In further embodiments, the device may simply be powered by the battery 17 or the wall jack 16 with no backup battery 17/18.

When using an embodiment with both primary 17 and backup batteries 18, a battery switch-over circuit 15 may be used to change between the two batteries depending on which one has been drained. A voltage regulator circuit 13 may be in communication with any one of the wall jack 16, primary battery 17, and/or backup battery 18 to provide the proper power levels to the various components, specifically the microcontroller 10. In an exemplary embodiment, the voltage regulator circuit 13 may provide consistent power between 3 VDC and 5 VDC to the components.

Table 1 below represents several examples of how one may utilize the localized severe weather warning device to determine if severe weather is imminent. Each example may measure different parameters and each may have a different threshold value(s) that may be used to trigger the alarm. It should be noted that this is only a selection of examples, and one of skill in the art may use this teaching to create a number of different measurement parameters and threshold values for the device.

TABLE 1

|  | Rate of Drop in Barometric Pressure ΔP(MAX) | Barometric Pressure P(MIN) | Temperature T(MAX) | Dew Point DP(MAX) |
| --- | --- | --- | --- | --- |
| Example 1 | 0.003 in. Hg/min | N/A | N/A | N/A |
| Example 2 | 0.003 in. Hg/min | 29.75 in. Hg | N/A | N/A |
| Example 3 | 0.002 in. Hg/min | 29.85 in. Hg | N/A | N/A |
| Example 4 | 0.004 in. Hg/min | 29.65 in. Hg | 58° F. | 63° F. |
| Example 5 | 0.003 in. Hg/min | 29.75 in. Hg | 60° F. | 65° F. |
| Example 6 | 0.003 in. Hg/min | 29.75 in. Hg | 62° F. | 67° F. |

It has been discovered, that these parameters and thresholds may be used to predict imminent severe weather. Generally speaking, pressure drops between approximately 0.002-0.004 in.Hg/min can indicate that severe weather is approaching, although it may not be clear if this is a winter storm, spring storm, or tornado. Further general considerations indicate that severe weather (esp. tornadoes) occur when the barometric pressure is less than approximately 29.65-29.85 in. Hg. When practicing Examples 1-3, user's may only utilize the device during tornado season, so that false alarms are not triggered due to the barometric pressure attributes of a spring or winter storm. However, in some embodiments the user may still practice Examples 1-3 year round, as (depending on the climate) the indication of severe weather or spring/winter storms may also be beneficial. When predicting tornadoes specifically, it has been found that these tend to occur when the temperature is above approximately 58-62° F. and the dew point is above approximately 63-67° F.

Figure 2:
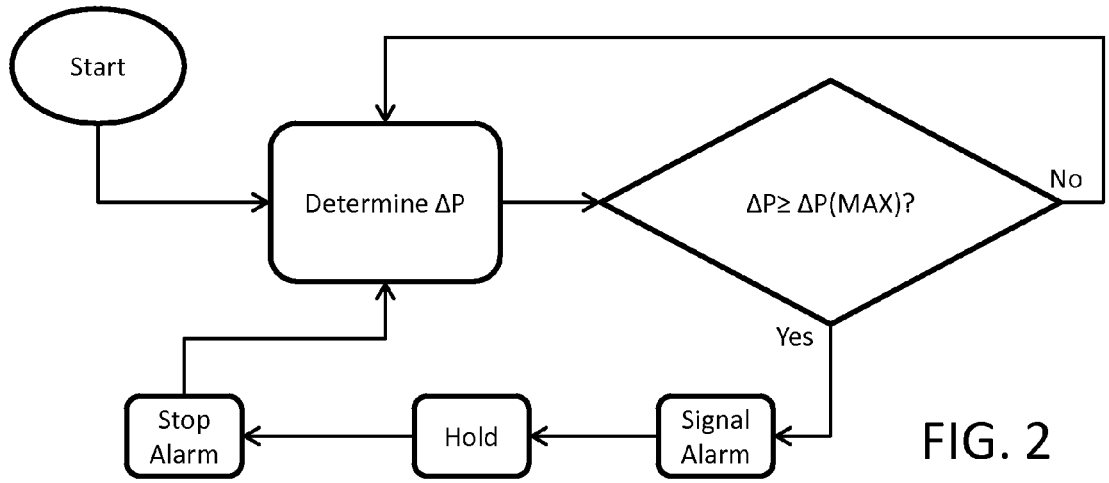
FIG. 2 is a logical flowchart for one method of operating the localized severe weather warning device.

FIG. 2 is a logical flowchart for one method of operating the localized severe weather warning device. This particular method may be practiced with the parameters and thresholds shown in Example 1 of Table 1. After the initial startup, the system should read the incoming data from the pressure sensor 4 and perform a calculation to determine the current rate of drop in barometric pressure ΔP and compare this to the threshold value of ΔP(MAX). If the current ΔP is equal to or higher than the threshold ΔP(MAX), the alarm is sounded. If the current ΔP is less than the threshold ΔP(MAX), the system returns to re-read the data from the pressure sensor 4.

Figure 3:
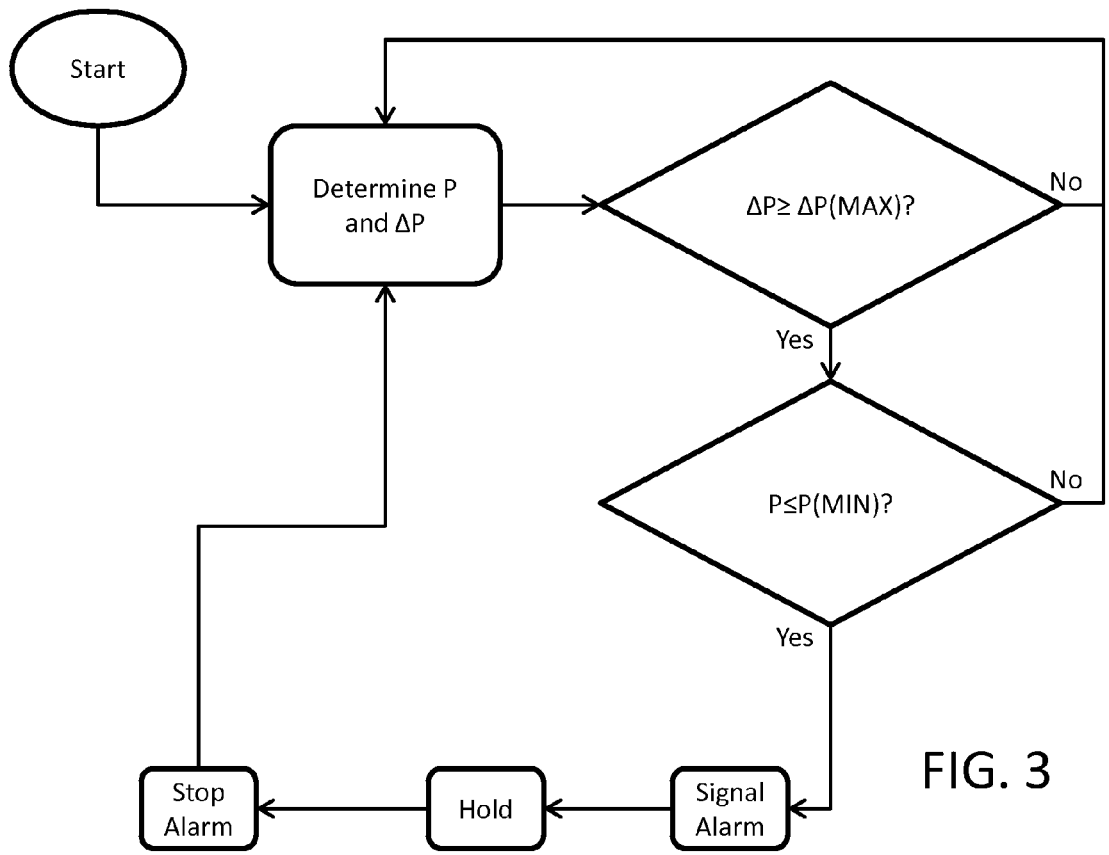
FIG. 3 is a logical flowchart for another method of operating the localized severe weather warning device.

FIG. 3 is a logical flowchart for another method of operating the localized severe weather warning device. This particular method may be practiced with the parameters and thresholds shown in Examples 2 and/or 3 of Table 1. After the initial startup, the system should read the incoming data from the pressure sensor 4 and perform a calculation to determine the current rate of drop in barometric pressure ΔP and compare this to the threshold value of ΔP(MAX). If the current ΔP is less than the threshold ΔP(MAX), the system returns to re-read the data from the pressure sensor 4. If the current ΔP is equal to or higher than the threshold ΔP(MAX), the system proceeds to compare the current pressure P with the threshold P(MIN). If the current pressure P is less than or equal to P(MIN), the alarm is sounded. If the current pressure P is greater than P(MIN), the system returns to re-read the data from the pressure sensor 4.

Figure 4:
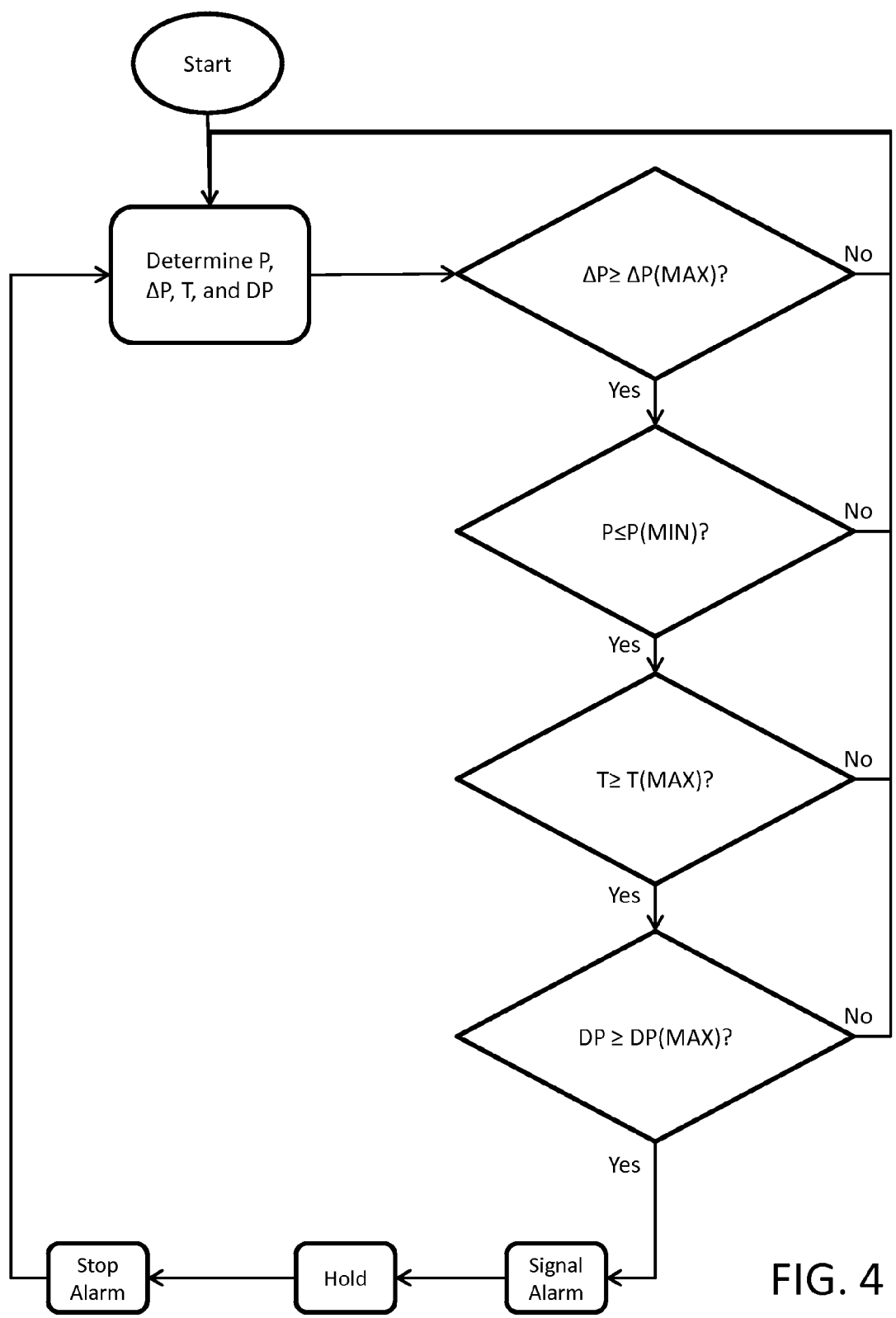
FIG. 4 is a logical flowchart for a further method of operating the localized severe weather warning device.

FIG. 4 is a logical flowchart for a further method of operating the localized severe weather warning device. This particular method may be practiced with the parameters and thresholds shown in Examples 4, 5, and/or 6 of Table 1. After the initial startup, the system should read the incoming data from the pressure sensor 4, temperature sensor 6, and humidity sensor 12 and perform a series of calculations.

First, the system may perform a calculation to determine the current rate of drop in barometric pressure ΔP and compare this to the threshold value of ΔP(MAX). If the current ΔP is less than the threshold ΔP(MAX), the system returns to re-read the data from the sensors. If the current ΔP is equal to or higher than the threshold ΔP(MAX), the system proceeds to compare the current pressure P with the threshold P(MIN). If the current pressure P is greater than P(MIN), the system returns to re-read the data from the sensors.

If the current pressure P is less than or equal to P(MIN), the system proceeds to compare the current temperature T with the threshold T(MAX). If the current temperature T is less than the threshold T(MAX), the system returns to re-read the data from the sensors. If the current temperature T is greater than or equal to the threshold T(MAX), the system proceeds to compare the current dew point DP with the threshold DP(MAX). If the current dew point DP is less than the threshold DP(MAX), the system returns to re-read the data from the sensors. If the current dew point DP is greater than or equal to the threshold DP(MAX), the alarm is sounded.

It should also be noted that there may be a delay before the system returns to re-read the data from the sensors. Thus, in some embodiments, when the threshold values are not met, the system may only sample the data from the sensors after a 30, 60, or 90 second delay. In some embodiments the precise amount of delay may be determined by how close the current parameters are to the threshold values. Thus, if the current parameters are only 70% of the threshold value, the system may have a 5 minute delay; but if the parameters are approximately 90% of the threshold value, the system may have a 30 second delay. In some embodiments, the system may run continuously, where the system immediately returns to read the data from the sensors when the threshold values are not met.

It should be noted that although the logical flowcharts may indicate an order of operations for determining each parameter and comparing them with their associated threshold values, this order is not required. Using FIG. 4 as an example, some embodiments may determine/compare the parameters in this order: (1) T, (2) DP, (3) P, and (4) ΔP. Generally speaking, all of the determinations and calculations happen almost simultaneously, due to the processor speed of the microprocessor 10. Thus, all that is required in the exemplary methods is that each determination/comparison is performed, but not in that specific order.

The alarm may run for a pre-determined amount of time (ex. 5 minutes) before stopping and the system returning to read the incoming data from the sensors. Alternatively, the alarm may be signaled and the system will instantly return to read the incoming data from the sensors and perform all of the calculations above to determine if the likelihood of severe weather has now passed. If so, the alarm may cease. If not, the alarm may continue to sound until the system has read the sensor data, performed the calculations, and determined that severe weather is no longer imminent.

Figure 5:
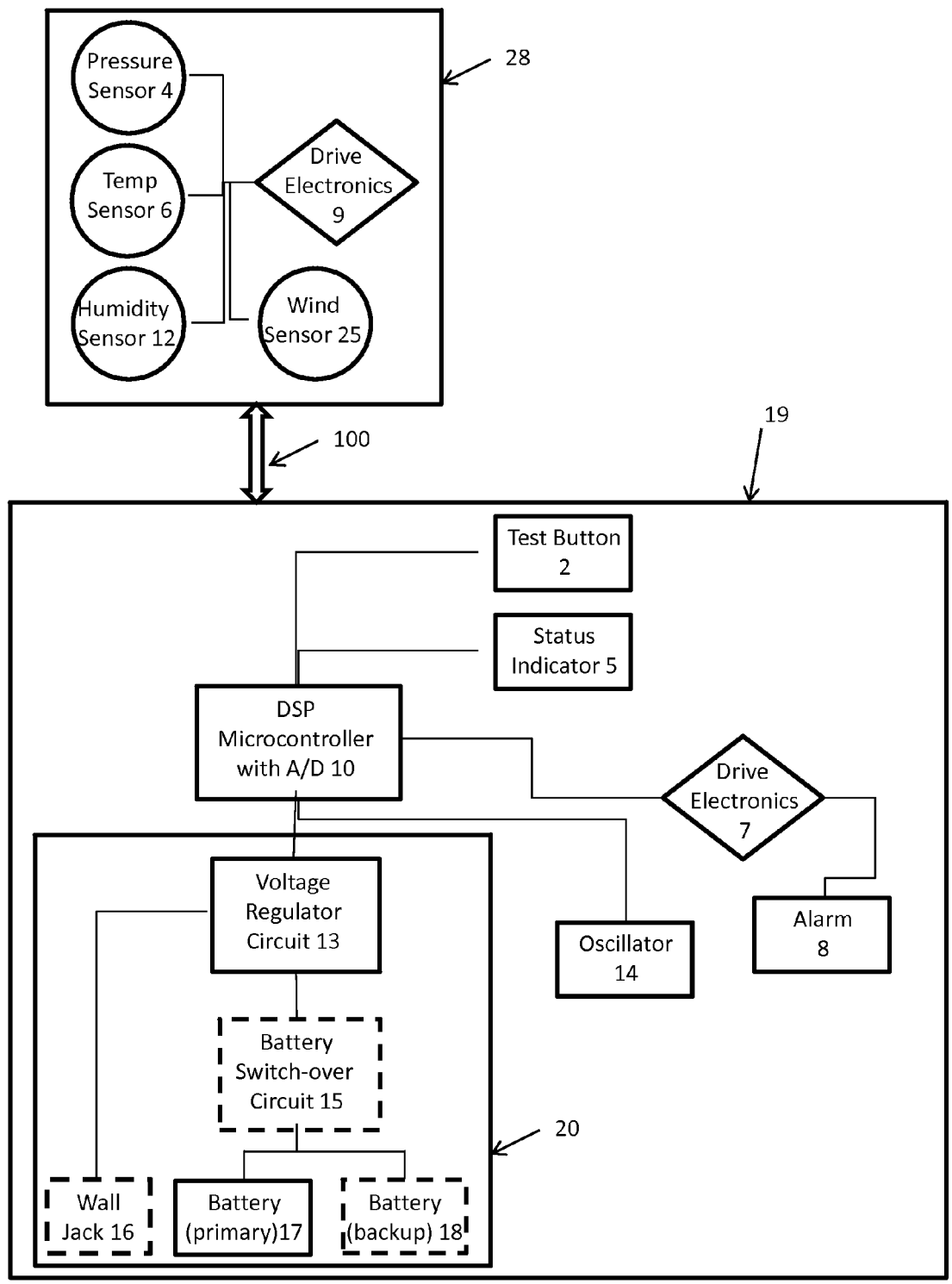
FIG. 5 is another embodiment of the localized severe weather warning device which utilizes wind speed and/or wind direction.

FIG. 5 is another embodiment of the localized severe weather warning device which utilizes wind speed and/or wind direction. This embodiment is substantially similar to the one shown in FIG. 1, with the notable addition of a wind sensor 25 to the outdoor sensor assembly 28. The wind sensor 25 may measure wind speed, wind direction, or both. The data from the wind sensor may also be conditioned and buffered through drive electronics 9 to facilitate the electrical communication with the indoor controller assembly 19. In this embodiment, the indoor controller assembly 19 can function as a 'weather information display' in addition to the severe weather warning device as detailed above. In this embodiment, a user can quickly view the status indicator (possibly a display) for a quick indication of any of the following parameters: barometric pressure, dew point, rate of decrease/increase in barometric pressure, temperature, humidity, wind speed, and wind direction.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. An apparatus for detecting the immediate localized presence of a tornado comprising:
    an outdoor sensor assembly useful in an outdoor environment, said outdoor sensor assembly including a barometric pressure sensor and a temperature sensor; and
    an indoor controller assembly in electrical communication through ribbon cable with the outdoor sensor assembly, said indoor controller assembly including:
        an alarm, and
        a microcontroller adapted to
            accept the incoming data from said barometric pressure sensor (P) and said temperature sensor (T),
            calculate the current rate of pressure drop per minute (ΔP) based on P,
            compare ΔP to a threshold pressure drop ΔP(MAX) of at least 0.003 in.Hg/min,
            compare T to a threshold temperature T(MAX), and
            signal the alarm when ΔP equals or exceeds ΔP(MAX) and T meets or exceeds T(MAX).

2. The apparatus of claim 1 further comprising:
    a status indicator in electrical communication with the microcontroller.

3. The apparatus of claim 1 wherein:
    the microcontroller is further adapted to compare the current pressure P to a threshold pressure P(MIN), and
    signal the alarm when P is less than or equal to P(MIN).

4. An apparatus for detecting the immediate localized presence of a tornado comprising:
    an outdoor sensor assembly useful in an outdoor environment, said outdoor sensor assembly including:
        a barometric pressure sensor,
        a wind speed sensor,
        a temperature sensor, and
        a humidity sensor,
    an indoor controller assembly in electrical communication with the outdoor sensor assembly, said indoor controller assembly including:
        an alarm, and
        a microcontroller adapted to
            accept the incoming data for pressure (P), temperature (T),
            calculate the current rate of pressure drop per minute (ΔP),
            calculate the current dew point (DP),
            compare ΔP to a threshold pressure drop ΔP(MAX),
            compare T to a threshold temperature T(MAX),
            compare DP to a threshold dew point DP(MAX), and
            signal the alarm when ΔP, T, and DP meet or exceed their respective threshold values.

5. The apparatus of claim 4 further comprising:
a status indicator in electrical communication with the microcontroller.

\* \* \* \* \*